United States Patent [19]
Belove et al.

[11] Patent Number: 5,491,820
[45] Date of Patent: Feb. 13, 1996

[54] DISTRIBUTED, INTERMITTENTLY CONNECTED, OBJECT-ORIENTED DATABASE AND MANAGEMENT SYSTEM

[75] Inventors: Edward Belove, Cambridge; James A. Culbert, Lynnfield; R. Patrick Johnson, Manchester, all of Mass.; David M. Heath, Nashua, N.H.; Michael F. Kraley, Lexington, Mass.; Deborah Méndez, Malden, Mass.; Sangam Pant, Winchester, Mass.; Stephen Zagieboylo, Norfolk, Mass.

[73] Assignee: AT&T Corporation, Basking Ridge, N.J.

[21] Appl. No.: 337,078

[22] Filed: Nov. 10, 1994

[51] Int. Cl.[6] .................................................. G06F 13/00
[52] U.S. Cl. .................. 395/600; 395/894; 395/650; 395/200.09; 395/821; 364/246.92; 364/249.8; 364/260.3; 364/967; 364/DIG. 1; 364/DIG. 2
[58] Field of Search ..................................... 395/600, 575, 395/650, 200

[56] References Cited

U.S. PATENT DOCUMENTS

| | | | |
|---|---|---|---|
| 4,805,134 | 2/1989 | Calo et al. | 395/600 |
| 4,993,030 | 2/1991 | Krakauer et al. | 371/40.1 |
| 5,065,347 | 11/1991 | Pajak et al. | 395/159 |
| 5,235,680 | 8/1993 | Bijnagte | 395/161 |
| 5,347,632 | 9/1994 | Filepp et al. | 395/200 |
| 5,369,778 | 11/1994 | San Soucie et al. | 395/800 |

*Primary Examiner*—Thomas G. Black
*Assistant Examiner*—Cuan Pham
*Attorney, Agent, or Firm*—Cesari and McKenna

[57] ABSTRACT

Disclosed is an object-oriented approach to storage and transmission of retrievable items in a client-server computer environment. Special processing modules manage retrieval and permanent storage, on client computers, of requested objects in a manner that minimizes unnecessary transmission and storage. The user enters a "subscription" in connection with items related to hierarchically inferior items. The subscription specifies the amount of information the user desires to download and store locally with respect to a specified hierarchical depth level. The invention also includes a pruning module for deleting, from local storage, items inconsistent with the subscription and which the user does not explicitly indicate a desire to store, and a facility for updating locally stored items upon re-establishment of communication with the server.

19 Claims, 4 Drawing Sheets

DISTRIBUTED, INTERMITTENTLY CONNECTED, OBJECT-ORIENTED DATABASE AND MANAGEMENT SYSTEM

FIELD OF THE INVENTION

This invention relates to client/server computational architectures, and in particular to methods and apparatus for facilitating optimized, shared retrieval and storage responsibilities in an interactive, multi-user distributed environment.

BACKGROUND OF THE INVENTION

Online computer services are large regional or national networks accessible to consumers by subscription, Providers offer their subscribers a wide range of services, including on-demand access to electronically represented newspapers, software and documents that can be "downloaded" at the user's request; discussion groups in which subscribers can take part by computer; electronic mail among subscribers and non-subscribers; and various forms of entertainment, Generally, consumers connect to a service via telephone, and the service charges its subscribers a recurring fee for its basic service package and a variable fee for the time they are actually connected.

Online services have experienced an enormous increase in their customer bases in the last few years, owing both to the proliferation and growing sophistication of personal computers as well as to the expansion of available services. The need to provide a large, widely dispersed user group with on-demand access to the central online service requires substantial computational capability. The service must not only control and monitor user access, but must also maintain a large, constantly growing reservoir of information to which many users must have simultaneous access.

One widely accepted computer architecture, developed specifically to accommodate the "distributed computing" environments that characterize online services, is the client-server model. In its purest form, a client-server system consists of a central server (sometimes called the host), which is a very powerful computer (or cluster of computers that behaves as a single computer) that services the requests of a large number of smaller computers, or clients, that connect to it. The client computers never communicate with one another, instead exchanging data only with the server, which thereby acts a clearinghouse for client requests and inter-client communications. A server, therefore, may be a large mainframe or minicomputer cluster, while the clients may be simple personal computers.

Although they need not be powerful, it is nonetheless important that clients possess a basic level of on-board processing capability; unlike older timeshare systems, which utilized "dumb" terminals that were essentially driven by the central machine, the client-server model requires that each client be capable of independent computational operation. In this way, the central server need only accept and deliver messages to the clients, which process them for output to the user. This approach limits the processing burden on the server and facilitates faster, readily customized responses by the clients.

Figure 1:
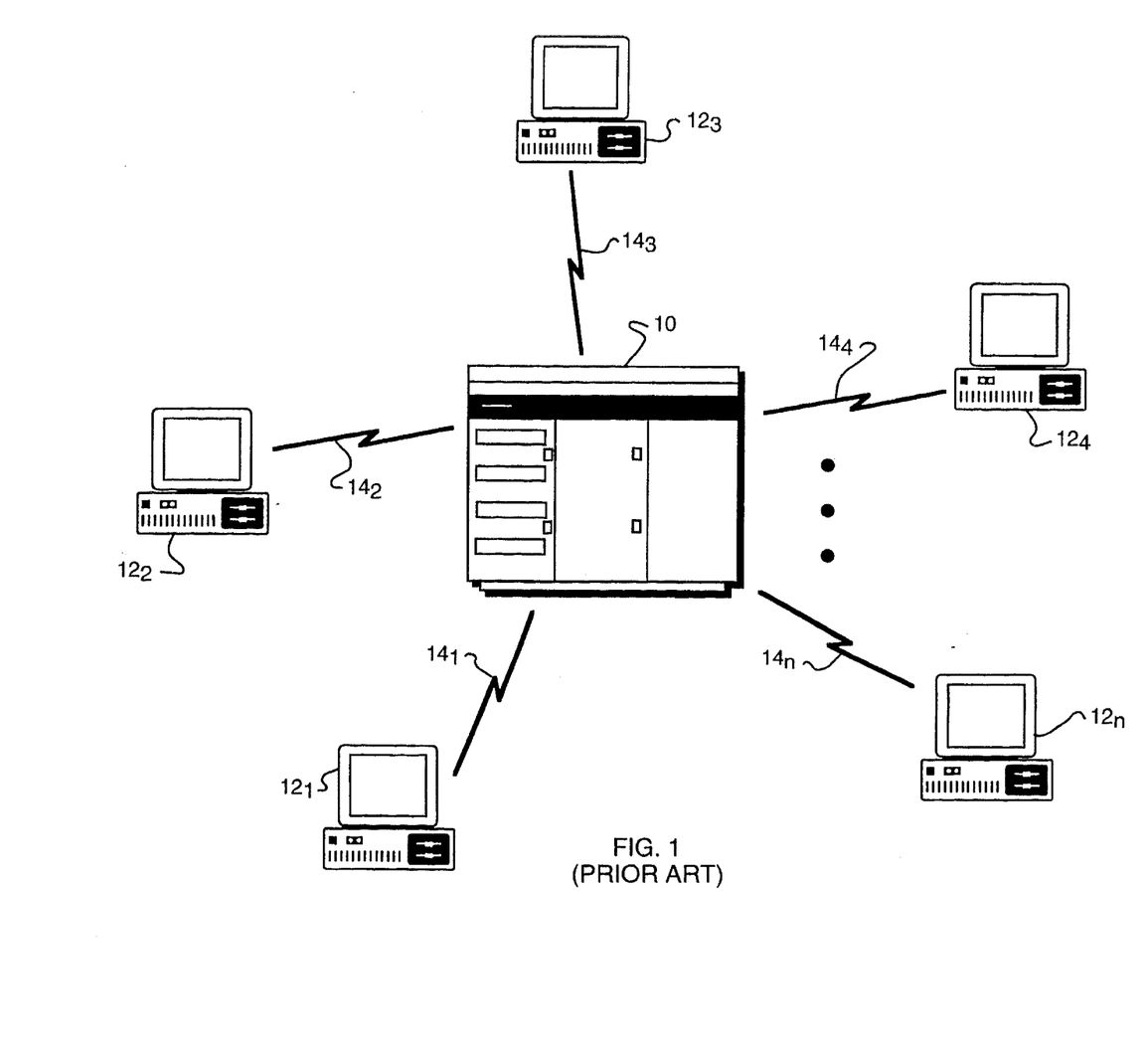
FIG. 1 schematically illustrates a simplified client-server arrangement.

An exemplary client-server configuration is illustrated in FIG. 1. A central server 10 communicates with a series of client computers $12_1, 12_2, 12_3, 12_4 \ldots 12_n$ over a coextensive series of physical connections $14_1, 14_2, 14_3, 14_4, \ldots 14_n$. The terms "server" and "host" are herein used interchangeably to denote a central facility consisting of a single computer or group of computers that behave as a single unit with respect to the clients. In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the Transmission Control Protocol, or TCP, according to which messages are actually broken up into IP packets for transmission for subsequent collection and reassembly. TCP/IP connections are quite commonly employed to move data across telephone lines, and have been adopted not only by online services but throughout the worldwide, integrated network communication web known as the Internet.

The Internet contains vast stores of technical and academic information, but much of this is formatted as undifferentiated text, and requires mastery of a difficult command vocabulary to access effectively. The information provided by online services, in contrast, is readily accessible without special training, tailored in content to the interests of subscribers, and presented in a visually appealing fashion. Online services typically offer their subscribers access to the Internet as well, once again in a format designed to promote easier identification and retrieval of information.

The server executes a variety of applications in response to requests issued by clients. Most of these requests, however, are for retrieval of information stored on one of the server's databases. The application programs executed by the server, therefore, by and large relate to data management and transfer. In this sense, the term "application" denotes a body of functionality for obtaining, processing and/or presenting data to a user. For example, electronic mail (e-mail) facilities allow the user to send and receive memo-type communications; document browsers display hierarchically organized collections of document titles, any of which can be obtained by a user simply by "clicking" on a title with a position-sensing mouse device or otherwise designating the document. Applications can be "active," operating only when affirmatively engaged by a user, or maintain a "background" task mode, which operates even when the application is not active.

Because the bulk of interaction between the server and clients relates to data identification and retrieval, the large stores of data moving from the server to the clients can impose substantial transfer costs and result in unnecessary redundant storage. If a retrieved item of data is not only downloaded to a client but also stored permanently on that client, it will remain accessible to the client user after the user's communication session with the server is over (and without instituting a new connection). However, if the client user is unlikely to require convenient access to the item, its local storage represents a waste of resources. On the other hand, if requested items are never cached on clients, the need for repetitive retrievals from the server likewise represent a resource waste.

Transmission of unnecessary data likewise imposes needless costs. The communication circuit between a client and the server is often expensive to maintain, and in any case occupies one of a finite number of channels that the server can support at any one time. Thus, unnecessary communication imposes direct costs (in terms of telecommunication expense) and indirect costs (because the channel capacity of the server must be greater than what is truly necessary).

SUMMARY OF THE INVENTION

The present invention utilizes an object-oriented approach to storage and transmission of retrievable items, in conjunction with special processing modules that manage permanent storage of retrieved items on client computers, to minimize transmission of unnecessary item components to the clients and to optimize their storage burdens. In the context of the present invention, transferable data is represented as information units referred to as "items." An item is an atomic "object" unit, the smallest independent unit of information. In an object-oriented system, each object is associated with a unique identifier, and may or may not be represented by contiguously stored electronic data. Indeed, an item need not even reside on a single database; the server's database management software assembles an item (e.g., an article containing related text and image data) from its constituent components and transfers the item so that the user receives it as a single unit. (Because, in the context of the present invention, the communication protocol is preferably based on TCP/IP, the item may actually travel from the server as several separate messages that are integrated by the client's communication module.)

Each item object represents a header containing information about the item; a set of data (most typically, displayable data that will ultimately appear on client screens when the object is downloaded); and a set of one or more associated procedures (including procedures that cause display of the displayable data on the client machines). This "encapsulation" of procedures within the objects themselves reduces the programming burden on applications designed to interact with objects; those applications need not "know" the details of object management and display, since each object carries its own structure and effectively orchestrates its own behavior.

Objects also possess the property of heritability, whereby properties or attributes of hierarchically superior objects are automatically inherited by hierarchically inferior objects. Heritability is managed by organizing the objects into classes, each of which represents the template for a set of similar (in the sense of sharing structure and behavior) objects. Each object is an instance of some class. Thus, objects in a subclass automatically acquire the procedures associated with hierarchically superior objects.

Hierarchical relationships among objects are not limited to inheritance and class. In addition, objects can be related to one another based on a hierarchical ranking, with higher-tier "parent" objects having pointers to lower-tier "children" objects. As a result, higher-tier objects behave as if they "contain" hierarchically related, lower-tier objects. Thus, in the context of the present invention, a "folder" item stored on the server may contain a list of titles of items within the folder, and a procedure for displaying the list on clients. Each of the listed items represent "children" of the folder. For example, a folder might list a series of downloadable newspaper articles; the articles themselves are the folder's children, and each contains the body, pictures and sidebars of an individual, displayable article.

Objects can also be linked to one another. A linked object, while not contained in the linking object in the manner of a lower-tier object, is nonetheless referenced in the linking object. The procedures associated with the linking object determine the significance of the reference and its effect. For example, in the context of the present invention, a linking item may contain a procedure for causing a client to request linked items from the server upon selection of the linking item by a user.

Management of object classes, attributes, encapsulated procedures and inter-object linkages occurs through an object-oriented database ("OODB") system, design and implementation of which are well-known in the art. Representation of retrievable items as objects minimizes the need for specialized software on the client, since the items contain their own display instructions. However, the cost of this flexibility is greater transmission overhead, since objects contain more than just the displayable data. For the same reason, objects also occupy substantial memory space on the client. The present invention, therefore, utilizes an interactive structure that provides clients with only enough information about items to allow the client user to request them and the server to process the request.

In particular, the invention recognizes that the OODB is only intermittently connected to the client, and can provide instantaneous access to server-stored items only when so connected, but that not all items of possible interest to the client user warrant local storage. Furthermore, the invention allows client users to specify the degree of item content that is actually transmitted; for example, unless the user is certain that he will view the entire contents of a hierarchical tier of items, he can be provided only with the titles of such items, leaving him free to select individual ones of these for retrieval and transmission as desired. By imposing downloading costs on each item (which can vary, depending on the value of the information), the user is discouraged from needlessly downloading and storing unnecessary material.

In practice of the invention, the user enters a "subscription" in connection with items related to (or likely in the future to be related to) hierarchically inferior items. The subscription specifies the amount of information the user desires to download and store locally with respect to a specified hierarchical depth level. For example, the user may desire the entire contents of higher-tier items, but remain willing to accept only the titles of lower-tier items since their full contents can be retrieved from the server upon specific request.

During the course of an online session, the user may retrieve numerous items each of which is downloaded and stored locally. Accordingly, the client "object store" on device 19 may contain many more items, at the end of a session, than are consistent with the subscription restrictions. The invention therefore allows the user to "tag" items he wishes to retain on the object store and, at the conclusion of a session, deletes from the object store untagged items to the extent inconsistent with the subscription restrictions.

The invention also comprises means for updating items previously stored locally upon re-establishment of communication with the server. The client maintains, as part of its object store, a list of the dates and times each stored item was last retrieved. The server maintains a list of the dates and times each item was last modified. To update the client item store, the client sends the server a list of stored items it wishes to update, along with the dates and times they were last retrieved; the server responds by furnishing the client with new versions of items that have been modified since these dates and times, and a list of items that have not been modified (i.e., for which the client already has the current versions).

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

1. System Organization

Figure 2:
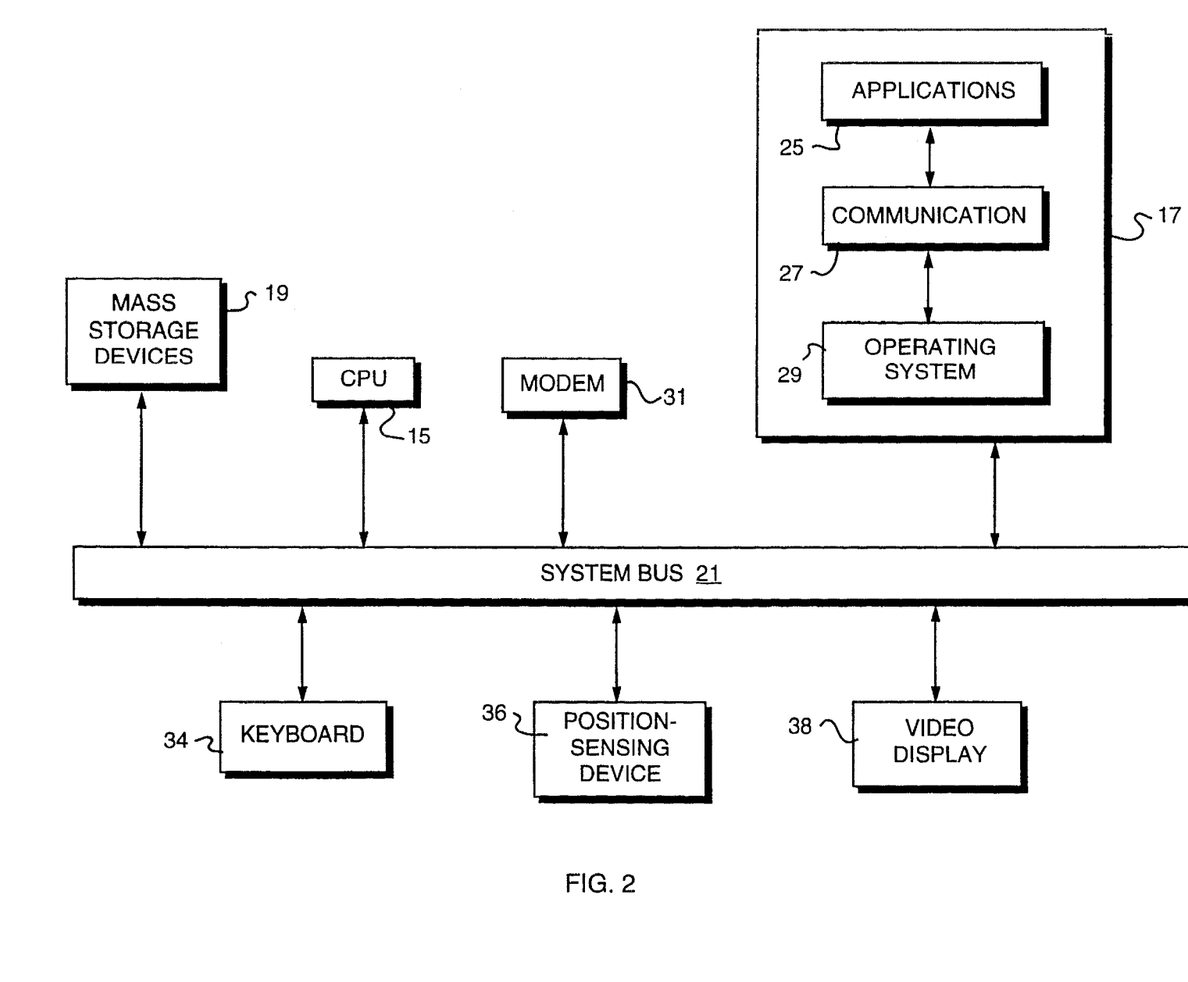
FIG. 2 schematically illustrates the components and operation of a computer system serving either as host or client.

Refer first to FIG. 2, which illustrates generic computer circuitry representative both of clients and servers. The depicted computer system includes a central-processing unit 15, which performs operations on and interacts with a main system memory 17 and components thereof. System memory 17 typically includes volatile or random-access memory (RAM) for temporary storage of information, buffers, and portions of the computer's basic operating system. The system also includes at least one mass storage device 19, such as a hard disk and/or CD-ROM drive. All components of the system communicate over a bidirectional system bus 21.

While clients and servers bear similar hardware configurations at this level of generality, their relative processing and data-storage capabilities are naturally quite different. A client may be, for example, a personal computer running the Windows graphical user interface supplied by Microsoft Corp., while the server is ordinarily some type of mainframe or minicomputer cluster running several multi-platter hard drives and/or optical storage components as mass storage device 19.

System memory 17 contains, during operation, a series of applications 25 appropriate to the role the computer 10 is to play in the client-server system, a communication module 27 (preferably implementing TCP/IP) capable of transferring data among machines, and an operating system or graphical user interface 29. Communication module 27 drives a modem 31 or other data-transmission circuitry to transfer streams of digitally encoded data over telephone or other communication lines.

The user interacts with the system using at least one input device, preferably a keyboard 34 and a position-sensing device (e.g., a mouse). The signal produced by either such device can be employed to designate information or select particular areas of a video screen display 38 (or other suitable device, such as a flat-panel display), over which the user observes the state of the system or, in the case of a subscriber, views requested information. Ordinarily, interactions between the user and applications 25 are managed through a suitable graphical user interface implemented by operating system 29 and appearing on display 34.

In operation, a subscriber (or "client user") employs a client computer as described above to communicate and interact with the server. The subscriber's connection to the host is established and maintained by a dedicated one of the applications 25, which sends and receives messages via the physical connection to the server sustained by communication module 27. The client effectively runs its own set of applications 25 as well as those on the server with which it interacts through message exchange.

To implement the features of the present invention, the client and server computers are provided with specialized modules stored in system memory 17 during operation. These modules orchestrate the transfer of items from the server to clients, and optimal storage of retrieved items on the clients.

Figure 3:
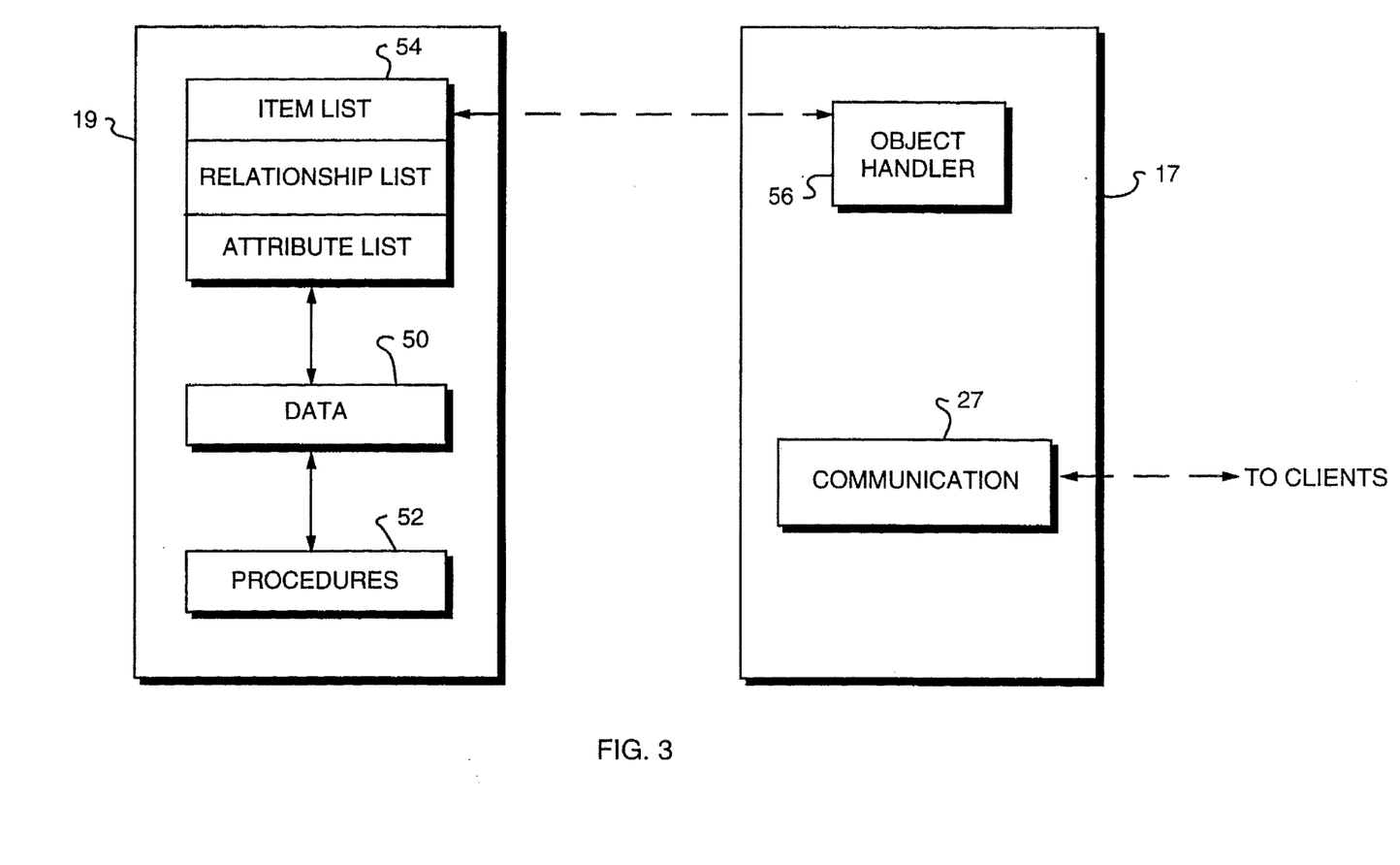
FIG. 3 schematically illustrates the server-based components of the present invention.

Refer to FIG. 3, which shows the key server-based features implementing the present invention. As indicated earlier, object-oriented storage of items on the server is facilitated by an OODB and associated management software. The OODB includes the underlying item data (displayable data, other item attributes, archival comments of the system designers); the collection 52 of procedures associated with any one or more items; and a master table 54, which maintains a list of all item identifiers, a list of relationships among items, and a list of attributes (including procedures) associated with each item. All of these components are stored on the server's mass storage device 19. The attribute list includes pointers to locations on device 19 where the various data and procedures reside.

An object handler 56, originally stored on device 19 but loaded into main system memory 17 at the start of server operation, processes item requests from clients (delivered via communication module 27) and fills these utilizing the entries in master table 54; the interaction between object handler 56 and master table 54 is represented by a dashed line, since it actually occurs over bus 21. Thus, when it receives an item identifier, object handler 56 engages conventional database management functions to assemble the requested item from mass storage using the pointers in master table 54. It then passes the assembled object to communication module 27, which routes it to the client that issued the request. Object handler 56 also logs any downloading charges associated with a routed item for billing purposes.

Figure 4:
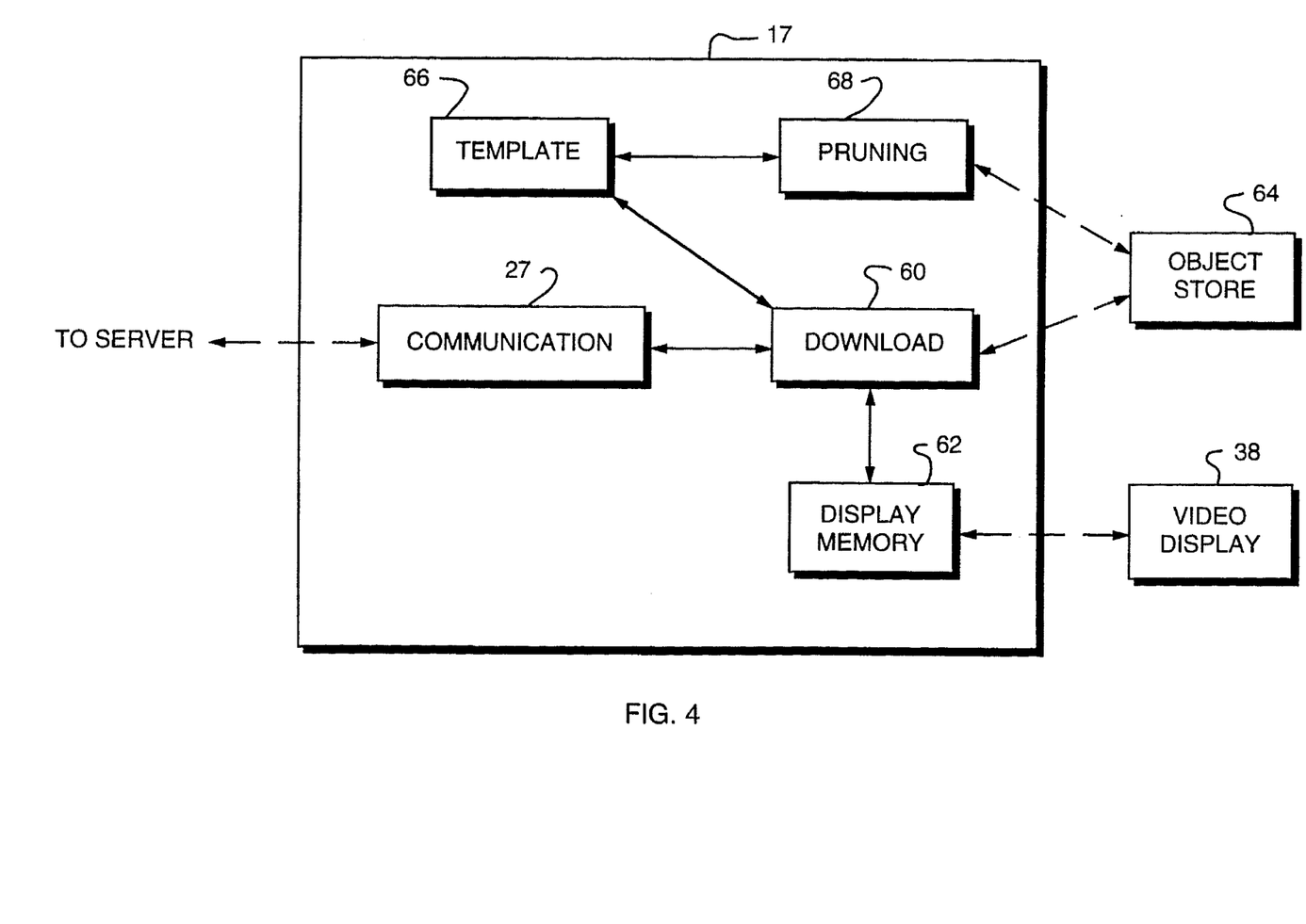
FIG. 4 schematically illustrates the client-based components of the present invention.

On the client side, illustrated in FIG. 4, a user employs an input device to articulate item requests (the form and content of which will be described below) over a suitable interface implemented by operating system 29 and displayed on video monitor 38. The requests are routed to the server over a communication circuit maintained by communication module 27. A suitable system for maintaining such circuits, and for facilitating identification of the client to the server, are described in a copending application (commonly owned and filed simultaneously herewith) entitled, METHOD AND APPARATUS FOR FACILITATING SIMPLIFIED DATA INTERCHANGE IN A DISTRIBUTED COMPUTER ENVIRONMENT. This application is hereby incorporated by reference in its entirety.

Items transmitted by the server to the client are received by a downloading and object-management module 60, which is itself stored in the client's main system memory 17 during operation. Downloading module 60 loads each item into a separate memory partition, allowing the item's encapsulated procedures to execute and thereby cause, at a minimum, display of the item on the client. More specifically, the downloaded item processes its associated data into a displayable form (e.g., a bitmap or pixelmap), or into a form easily converted for display by a resident client application 25; the displayable data is stored in a display memory or buffer 62, the contents of which determine the instantaneous appearance of video display 38.

The downloading module 60 may also store the item in an object store 64, resident on the client's mass storage device 19, but only if appropriate in light of the client's need for continuous, instantaneous access to the item following termination of the session. (As used herein, a "session" is the duration of the client's interaction with the server over a communication circuit, and lasts until the circuit is terminated.) A subscription template 66, described in greater detail below, determines which received items, and to what extent, are to be cached in the client's object store 64. The template is only presumptive, however, and a client can override it by expressly requesting from the server items that would ordinarily be filtered out by template 66; these items are stored in object store 64. Therefore, a pruning module 68, preferably actuated at the conclusion of a session, selectively deletes items from object store 64 so that its contents conform to that dictated by template 66.

2. Object Organization

In accordance with the present invention, each item comprises a header and contents. An item's header contains the item identifier (which identifies the item to object handler 56); the title of the item (which is meaningful to a client user); an identifier of a pictographic symbol, or icon, associated with the item; any downloading surcharge, which represents an amount above and beyond the ordinary charge to the user for downloading an item; a list of encapsulated procedures; and any commentary inserted by the editor responsible for the item.

The content of an item includes everything needed to display the entire item on the client's display 38, and preferably in a separate window. Accordingly, an item's content comprises displayable data, display and any other procedures encapsulated with the object, and link information. Even if an item is really no more than a header, it possesses a logically associated, but empty, contents portion.

Consistent with standard object-oriented programming practice, the invention supports two types of links: hierarchical links between object "instances" of upper-tier and lower-tier classes, whereby offspring items are "contained" within parent items (all the way up the lineage to the uppermost tier); and forced item links between items that may be (but are usually not) hierarchically related. Hierarchical links are established by object handler 56 when an item is created using pointers, Item links, on the other hand, are not implemented automatically—that is, the linking item does not behave as if the linked items has been inserted wholesale—and are instead reflected in a link field present within the content of the linking item. An item link field contains the item identifier, item title, icon identifier and download surcharge associated with the linked item.

One important type of hierarchically arranged item is the folder, the purpose of which is to manage other items. Besides display instructions, the contents of a folder are the headers of all children items, any of which, as described below, can be selected by a client user for retrieval and viewing. Another hierarchically arranged item is the discussion. A discussion reflects commentary electronically exchanged by a group of subscribers in connection with a particular topic. The "root" of a discussion is the original topic. Each user may post a comment on the root topic, thereby contributing a primary "branch" to the discussion (which is denoted by the title the user gives to the comment); or may instead comment on one of the branches, thereby contributing a secondary (or deeper) branch. The content of a discussion item includes the content of all primary branch items and the headers of all lower-tier branches.

As noted above, a linked item ordinarily does not travel with the linking item; only the information in the link itself is transmitted by the server. However, a package item contains not only links to one or more other items, but also an encapsulated procedure that forces downloading of the linked items along with the package item itself. In this way, the client overcomes the usual pattern of retaining linked items on the server (and not allowing them into client object store 64) until selected by the client user.

It should be noted that the present invention also makes use of class hierarchies; for example, a package item is a subclass of a folder item, and therefore inherits all attributes associated with folders in the present context, however, unless otherwise noted discussions of hierarchically related items refer to parent/child object relationships rather than class relationships.

3. Object Presentation

As noted earlier, each item has associated display instructions that determine the manner in which the item is displayed on the client display 38. However, certain types of items are routinely displayed in characteristics ways. Folders are displayed in a format called a "browser", which contains a list of titles of all children items, icons indicating their types (e.g., an article, a downloadable software file, another folder, etc.) and, if desired, the downloading charge. The client user can select (e.g., with mouse 36) any of the items, which are thereupon retrieved and displayed according to their own display instructions. (If the item has not been stored in the client's object store 64, it is retrieved via request to the server and stored in object store 64; otherwise, downloading module 60 instructs operating system 29 to load the item from object store 64 into display memory 62.) Thus, the folder appears to contain its children items, although its contents portion in fact contains only references to them.

Discussions are displayed in a manner that permits the client user to view the various discussion topics and to post titles; the user can retrieve the text of any branch item by selecting it with mouse 36.

Folders can contain, in addition to downloadable files, discussions or other folders. For example, a folder entitled "Downloadable Games" might contain the subsidiary folder items entitled "Strategy Games," "Arcade-Style Games," "Role-Playing Games," and "Educational Games." Viewing the "Downloadable Games" folder in a browser format, the user would find the titles of the subsidiary folders preceded by the folder icon. Upon selecting any of these subsidiary folders, the user would be presented with a title list of its child items, again preceded by the appropriate icons. A representative item hierarchy, only one level of which would ordinarily be presented to the viewer at one time, might be:

(Folder) Downloadable Games
    (Folder) Strategy Games
        (Downloadable) GNU Chess
        (Downloadable) Multi-Player Chess
        (Discussion) Who wants to get together to play Multi-Player Checkers online?
    (Folder) Arcade-Style Games
        (Downloadable) Doom II
        (Article) Computer Gaming World review of Doom II
        (Discussion) Is Doom II too violent?
    (Folder) Role-Playing Games
        (Downloadable) Castle of the Winds
    (Folder) Educational Games where icons are indicated in parenthesis.

Linked items are represented by icons displayed along with the linking document (e.g., in a bar along the bottom of the screen). The linking item's display procedure includes instructions for constructing the icons from icon identifier information and the linked-item titles. When the user selects an icon, ordinarily by clicking on it with mouse 36, a procedure encapsulated in the linking item causes downloading module 60 to send a request for the item (the item identifier for which is contained in the link) to the server. When the request is fulfilled, downloading module 60 stores the retrieved item in object store 64 and enables the item to execute its encapsulated display instructions.

A package contains a linking item and at least one linked item that travel as a group. The client user ordinarily is not informed that an item is a package. Instead, the icon or the icon-plus-title browser entry corresponding to the linking (or "key") item is displayed in the usual manner. Selecting the key item results in retrieval of the entire package from the server, whereupon downloading module 60 stores the entire series of linked items in object store 64, and enables its display. The encapsulated display instructions of a package cause it to display its key item first; however, all linked items will be resident on the client (in object store 64 and, ordinarily, in system memory as well).

4. Transfer Restrictions and Pruning

Template database 66 contains restrictions on storage in object store 64 that prevent excessive accumulation of items. Each configuration of template 66 as it pertains to a particular item is referred to as a "subscription," since it governs the quantity of information the user will be able to access when not connected to the server. Preferably, downloading module 60 is configured to query the user to obtain a subscription restriction each time the user requests certain types of items for the first time. Most commonly, the user specifies subscription information in connection with folders. However, items that are expected to be periodically linked to other items may have associated subscription entries, as may discussions; for example, the user can be provided with the ability to extend or restrict the content retrieved and stored at the primary and lower-tier branch levels.

The user specifies the lowest-tier depth of an item (or class of item) for which the complete content is desired. Downloading module 60 stores this information in template 66 as a database record that preserves the connection between the instruction and the item to which it applies. Downloading module 60 consults template 66 each time an item is retrieved. When the client user requests an item for which a template entry exists, downloading module 60 stores on object store 64 only that amount of data consistent with the template entry. Ordinarily, the entries specify complete content or the header only. Preferably, downloading module 60 utilizes the information in template 66 not only in storing downloaded items, but in requesting them as well. By restricting the amount of information furnished to the client in response to a request, this arrangement substantially reduces transmission overhead, improving both transmission speed and overall server performance.

In the depicted embodiment, template filter 66 resides on the client. It is equally possible, in the alternative or in addition, to maintain separate templates for each client on the server. This might be done, for example, to prevent inappropriate user alteration of a template.

Although the template restrictions can prevent initial transmission of excess information, they do not restrict the user from downloading restricted items with specific requests. For example, if a user's subscription to the folder "Strategy Games" mentioned above is limited to the contents and header of the folder and the headers of its children, the user is still free to select any of the children and thereby retrieve its contents. Downloading module 60 processes this request like any other, retrieving, for example, the entire downloadable contents of GNU Chess or Multi-Player Checkers and storing them on object store 64.

Therefore, at the conclusion of a session, the user's object store 64 may contain far more information than would be consistent with the subscription limitations in template 66. In order to enforce the subscriptions and thereby limit needless item storage on object store 64, downloading module 60 permits the user to electronically "tag" items he wishes to retain in object store 64 notwithstanding their inconsistency with a subscription template. Tagging is easily accomplished, for example, by permitting the user to instruct downloading module 60 to set a flag or a tag byte that will become associated with each item as it is downloaded. At the conclusion of a session, pruning module 68 deletes, from object store 64, all untagged items to the extent inconsistent with template 66. Thus, continuing the above example, if the user had tagged GNU Chess but not Multi-Player Checkers, pruning module 68 would, at the conclusion of the user's session, delete the contents of Multi-Player Checkers but leave the stored GNU Chess item intact. In addition, pruning module 68 preferably also deletes any untagged item not contained in a folder provided to the user (e.g., a linked item); without this additional operation, pruning would occur only for items contained in subscription-limited folders.

Inconsistencies among subscriptions can arise if an item is a member of more than one folder, each of which is the subject of different subscription limits. For example, suppose in the above example that the user had entered a subscription to the uppermost-tier item, Downloadable Games, specifying "two levels deep, full contents." The user would then expect to receive the full contents of all the immediate children of downloadable games, namely, "Strategy Games," "Arcade-Style Games," "Role-Playing Games," and "Educational Games," as well as the full contents of their children. However, if the folder "Arcade-Style Games" were contained in another, unrelated folder on the server (e.g., "Apogee Games"), and the user's subscription to this folder specified "headers only, infinite depth," the subscriptions, as they overlap relative to "Arcade-Style Games," would be inconsistent. Such inconsistencies are most easily resolved by application of system-wide or user-defined rules. For example, a suitable rule would provide the user with the information specified by the broader, more inclusive subscription.

The invention also provides means for updating folders as well as pruning them. This operation can be performed automatically at the beginning of a session, or when the client user selects a folder that had been stored, to the extent consistent with a subscription, in object store 64. In the latter case, selection of the folder would retrieve the data stored in object store 64 instead of retrieving all of that information anew from the server. However, it is entirely possible that the folder has changed since the session when the user last selected it; for example, new items may have been added.

To ensure that the user is provided with the most up-to-date copy of stored folders, downloading module 60 issues a List Delta request to the server (again, at the beginning of the session for all folders, or only in response to the user's selection of a particular folder). The List Delta request includes the date and time through which the client-stored version of a folder's contents is current (i.e., when the individual items were most recently retrieved from the server). The attributes list of the server's master table 54 (see FIG. 3) contains records of when items are added to or deleted from the various folder items or modified. Using this information and the date/time provided by the client, object handler 56 generates a List Delta reply message. This message contains two lists: a list of all items that have been removed from the folder since the client-specified date/time, and a list of all items that have been either added or modified since this date/time. Accompanying the list are the new items themselves and new versions of the modified items. The client's downloading module 60 utilizes the reply message to delete items on the first list from object store 64 (and, if the client user has already selected the folder, deletes their titles from display memory 62 as well. Downloading module 60 adds the newly received items to object store 64 (and, if appropriate, adds their titles to display memory 62).

It will therefore be seen that the foregoing represents an efficient and desirable approach to periodic retrieval of information by a plurality of distributed clients from a central repository. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for facilitating selective data transfer from a central server computer to one of a plurality of client computers over a communication circuit, the apparatus comprising:
   a. a database for storing a plurality of retrievable items on the server, each item comprising:
      i. a header comprising an item identifier and an item title;
      ii. a contents portion comprising displayable data; and
      iii. at least one encapsulated procedure, the at least one encapsulated procedure including a procedure for controlling display of the displayable data;
   b. a table for defining, in the database, hierarchical and linked relationships among the items stored therein, each hierarchical relationship comprising an upper-tier item and at least one lower-tier item, and each linked relationship comprising a linking item and at least one linked item;
   c. resident on the server, means for retrieving requested items and providing them to clients;
   d. resident on each client:
      i. means for issuing to the server requests for retrievable items, at least some of the requested items being upper-tier items hierarchically related to lower-tier items;
      ii. storage means for storing requested items; and
      iii. a client display, responsive to the display procedures of items stored on the client, for displaying requested items;
   e. a download filter template for specifying hierarchically based download and storage restrictions, on the client storage means, for at least some of the items; and
   f. means for downloading requested items to the client and storing them on the client storage means in accordance with the template.

2. The apparatus of claim 1 wherein the download filter template and the downloading means are resident on the client.

3. The apparatus of claim 1 wherein the download filter template is located on the server.

4. The apparatus of claim 1 wherein the storage restrictions exclude preselected item portions, and further wherein the means for issuing to the server requests for retrievable items requests only non-excluded portions of items.

5. The apparatus of claim 4 further comprising user-responsive means for selecting items and directing the means for issuing to the server requests for retrievable items to retrieve all portions of the selected items notwithstanding storage restrictions for said items.

6. The apparatus of claim 1 wherein a request for an upper-tier item causes the retrieval means to retrieve and provide all lower-tier items related to the upper-tier item, the template specifying one of (i) header and (ii) header, contents and procedures of provided lower-tier items.

7. The apparatus of claim 6 wherein at least some of the hierarchically related items are folder items and children items, each folder item being an upper-tier item and each child item of a folder item being a lower-tier item, and further wherein the displayable data of a folder item comprises the titles of all hierarchically related children items.

8. The apparatus of claim 7 further comprising selection means for selecting the title of a child item whose contents have been stored on the client, the selection means causing, in response to selecting the title, retrieval from the client storage means of the child item and its display on the client display.

9. The apparatus of claim 7 further comprising selection means for selecting the title of a child item whose contents have not been stored on the client, the selection means causing, in response to selecting the title, retrieval from the server and downloading of the child item onto the client.

10. The apparatus of claim 1 wherein at least some of the retrievable items are linking items each comprising at least one link to a linked item, the header of each linked item further comprising an identifier corresponding to an associated icon, wherein the display procedure of the linking item causes display on the client display of the icon identified by each linked item.

11. The apparatus of claim 10 further comprising selection means for selecting a displayed icon, the selection means causing, in response to selecting a displayed icon, retrieval from the server and downloading onto the client of the linked item associated with the icon.

12. The apparatus of claim 10 further comprising:
   a. selection means for:
      i. selecting the title of a child item whose contents have not been stored on the client, the selection means causing, in response to selecting the title, retrieval from the server and downloading and storage of the child item on the client; and
      ii. selecting a displayed icon, the selection means causing, in response to selecting a displayed icon, retrieval from the server and downloading and storage on the client of the linked item associated with the icon;
   b. a pruning module for deleting, from the client storage means, items whose storage is inconsistent with the restrictions specified in the download filter template.

13. The apparatus of claim 12 further comprising means for tagging (i) retrieved child items whose contents were not stored on the client prior to selection and (ii) retrieved linked items, wherein the pruning module deletes all untagged retrieved child items whose contents were not stored on the client prior to selection and untagged, retrieved linked items.

14. The apparatus of claim 12 wherein the pruning module is actuable in response to termination of a communication circuit between the client and the host.

15. The apparatus of claim 1 wherein at least some of the retrievable items are packages, each package being a linking item linked to at least one linked item and comprising a procedure for causing retrieval from the server and downloading onto the client of the at least one linked item.

16. The apparatus of claim 1 further comprising, on the client, user-responsive means for configuring the template, said user-responsive means comprising an input device and an interface.

17. The apparatus of claim 1 further comprising updating means for conforming items stored on the client storage means with corresponding items stored on the server.

18. The apparatus of claim 17 wherein the update means comprises:
   a. means for storing, on the client storage means, a previous-retrieval time and date for each item stored on the client storage means;
   b. means for storing, on the server, an update date and time for each item stored on the server storage means;
   c. means for comparing the previous-retrieval times and dates for at least one item with the update times and dates for the at least one item; and
   d. means for modifying the client storage means to:
      i. delete items deleted from the server after their previous-retrieval times;
      ii. modify items modified on the server after their previous-retrieval times;
      iii. add items hierarchically related to or linked to items stored on the client storage means, the added items having been stored on the server storage means after the previous-retrieval times of items to which they are related or linked.

19. The apparatus of claim 1 wherein the means for issuing to the server requests for retrievable items operates automatically in accordance with the template.

* * * * *